United States Patent [19]

Person et al.

[11] Patent Number: 5,179,369

[45] Date of Patent: Jan. 12, 1993

[54] TOUCH PANEL AND METHOD FOR CONTROLLING SAME

[75] Inventors: Herman R. Person; Thomas L. Veik, both of Columbus, Nebr.

[73] Assignee: Dale Electronics, Inc., Columbus, Nebr.

[21] Appl. No.: 806,143

[22] Filed: Dec. 12, 1991

Related U.S. Application Data

[63] Continuation of Ser. No. 447,105, Dec. 6, 1989, abandoned.

[51] Int. Cl.⁵ .............................................. G09G 3/02
[52] U.S. Cl. .................................. 340/712; 341/20; 250/221
[58] Field of Search ............ 340/706, 712; 178/18, 178/19; 341/20, 31; 250/221

[56] References Cited

U.S. PATENT DOCUMENTS

| | | | |
|---|---|---|---|
| 3,553,680 | 1/1971 | Cooreman | 340/347 |
| 3,613,066 | 10/1971 | Cooreman | 340/347 |
| 3,764,813 | 10/1973 | Clement et al. | 250/221 |
| 3,917,957 | 11/1975 | Ansevin et al. | 250/343 |
| 4,144,449 | 3/1979 | Funk et al. | 250/221 |
| 4,205,304 | 5/1980 | Moore | 340/365 |
| 4,247,767 | 1/1981 | O'Brien et al. | 250/221 |
| 4,267,443 | 5/1981 | Carroll et al. | 250/221 |
| 4,294,543 | 10/1981 | Apple et al. | 178/18 |
| 4,459,476 | 7/1984 | Weissmueller et al. | 250/221 |
| 4,484,179 | 11/1984 | Kasday | 350/365 |
| 4,507,557 | 3/1985 | Tsikos | 340/709 |
| 4,553,842 | 11/1985 | Griffin | 340/706 |
| 4,558,313 | 12/1985 | Garwin et al. | 340/709 |
| 4,642,422 | 2/1987 | Garwin et al. | 178/18 |
| 4,645,920 | 2/1987 | Carroll et al. | 250/221 |
| 4,710,760 | 12/1987 | Kasday | 178/18 |
| 4,737,633 | 4/1988 | Sasaki et al. | 250/221 |
| 4,811,004 | 3/1989 | Person et al. | 340/712 |
| 4,855,590 | 8/1989 | Bures et al. | 250/221 |
| 4,868,912 | 9/1989 | Doering | 340/706 |

FOREIGN PATENT DOCUMENTS 1169151 6/1984 Canada.

OTHER PUBLICATIONS

ITW Entrex Brochure for Cyclops Touch Screen Device, at least Feb. 27, 1985 or earlier.

Primary Examiner—Ulysses Weldon
Assistant Examiner—M. Fatahiyar
Attorney, Agent, or Firm—Zarley, McKee, Thomte, Voorhees & Sease

[57] ABSTRACT

The touch panel mof the present invention comprises a plurality of beam emitter-detector pairs disposed around the perimeter of a video display area. The emitters direct energy beams toward the detectors which are located directly opposite across the display area from the emitters. A programmed central processor is connected to the emitters and is programmed to serquentially scan the emitters for actuating the emitters one at a time to create a modulated energy beam which is intermittently turned on and off for predetermined periods of time at a predetermined frequency. The detectors sense the modulated energy beams and create an electrical signal which is fed through a comparator and then to the central processor so that the central processor can analyze and determine the location of any blockage which appears on the screen.

5 Claims, 4 Drawing Sheets

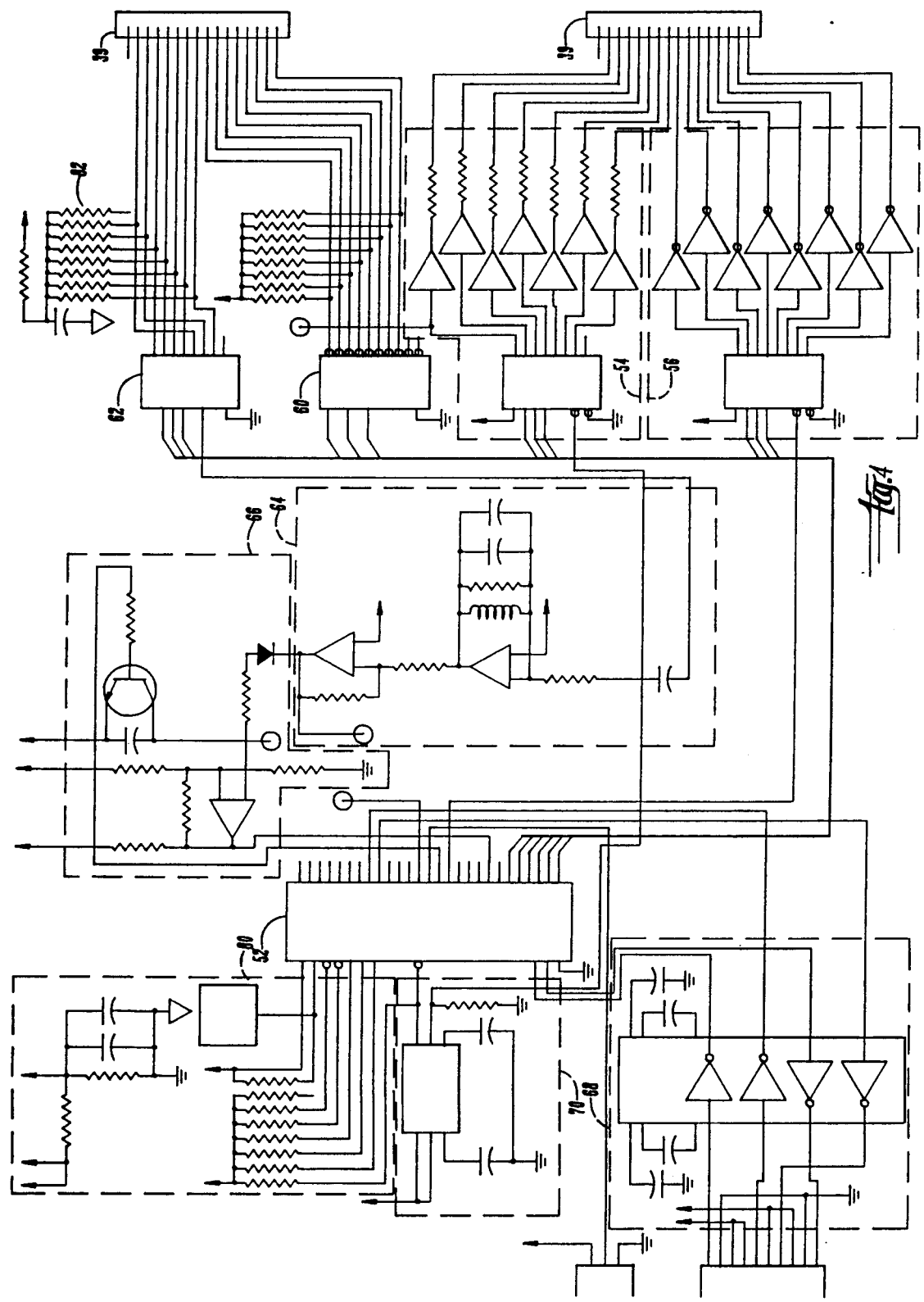

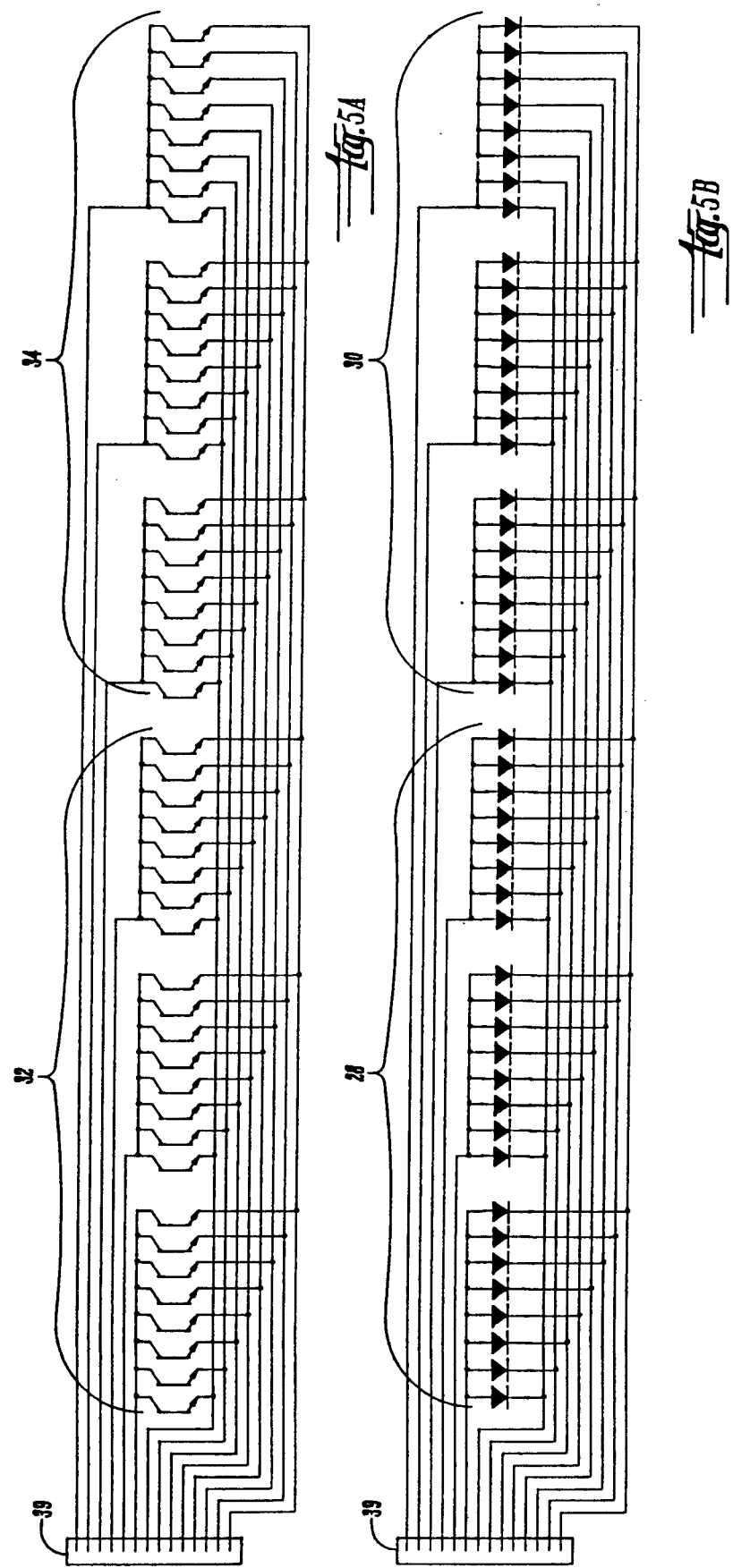

TOUCH PANEL AND METHOD FOR CONTROLLING SAME

This is a continuation of copending application Ser. No. 447,105 filed on Dec. 6, 1989 now abandoned.

REFERENCE TO MICROFICHE APPENDIX

Appended to this specification is a microfiche appendix of an embodiment of the software programming utilized with the invention. The microfiche appendix consists of one microfiche page containing a total of 15 frames.

BACKGROUND OF THE INVENTION

This invention relates to a touch panel and a method for controlling same.

Touch panel frames have recently become widely used in conjunction with video displays such as CRT screens or flat panel displays. One form of touch panel presently being used includes a rectangular frame which mounts in front of the display and which includes a plurality of devices around its perimeter for emitting energy beams and projecting them across the screen to an oppositely positioned beam detector. When a stylus or other foreign object blocks one or more of the beams, an analyzing circuit senses the blockage and calculates the location of the blockage on the surface of the screen. This information is then transferred to a host computer which controls the video display. Thus, it is possible to use a stylus, or even a person's finger, to write or mark on the screen.

Different kinds of energy beams have been utilized, but infrared beams are commonly used. One problem with the utilization of infrared beams is that ambient light can sometimes interfere with the ability of the system to sense blockage of the particular beams being projected across the screen.

One way of preventing the interference of ambient light is to cause the infrared beams to be modulated at a particular frequency so that the electronic circuitry can analyze and sense the blockage of a beam as it is being projected across the video screen.

An example of such a device is shown in U.S. Pat. No. 4,868,912. However, the device shown in this patent modulates the infrared beam with an LED modulator, which is a separate electronic device incorporated into the circuit. The LED modulator generates an analog sine wave signal which is later converted to a digital signal by other components within the device.

Therefore, a primary object of the present invention is the provision of an improved touch panel and method for controlling the same.

A further object of the present invention is the provision of an improved touch panel which utilizes a central processor for modulating the generation of the various infrared beams, rather than utilizing a separate electrical component for modulating the beams as is the case in the above U.S. Pat. No. 4,868,912.

A further object of the present invention is the provision of a touch panel and method for controlling same which permits the easy adjustment or variance of the particular manner in which the light beams are modulated.

A further object of the present invention is the provision of an improved touch panel and method for controlling same which utilizes simpler electrical circuitry and fewer electrical components than in prior devices.

A further object of the present invention is the provision of an improved touch panel which uses a central processor capable of initially generating a digital modulated signal for modulating the energy beam.

A further object of the present invention is the provision of an improved touch panel which is economical to manufacture, durable in use, and efficient in operation.

SUMMARY OF THE INVENTION

The touch panel of the present invention includes a rectangular frame having a plurality of beam emitter-detector pairs disposed around the perimeter thereof. The emitters generate a plurality of infrared beams which are directed across the display panel and which are received by the detectors. The detectors analyze the light received, and create an electrical signal which is sent to a comparator. The comparator analyzes the signal to determine whether or not a blockage of the beams has occurred. If a blockage has occurred, the comparator sends a blockage signal to a central processing unit which analyzes the blockage signal and calculates the location of the blockage on the screen.

The central processor is also connected to the emitter-detector pairs, and controls the scanning of the emitter-detector pairs one at a time. As the scanning occurs, the central processing unit also generates a digital signal which controls the modulation of each emitter as it is activated. The modulation of this beam is at a frequency which may be varied according to the choice. Frequencies of from between 10 kilohertz and 500 kilohertz will provide satisfactory results. The preferred frequency is between 60 to 90 kilohertz.

The processing unit is programmed to modulate the frequency of the light beam as described above. Furthermore, the particular beam created is in a square wave form. That is, the beam alternates between on and an off condition at a frequency to be determined by the program within the central processing unit.

Prior devices have been utilized which modulate the light beams, but these prior devices have generated a sine wave form to the light beam, rather than the square wave of the present invention. Furthermore, the apparatus for modulating the beams in prior devices has been a separate electrical component as opposed to the central processing unit of the circuitry. The program within the central processing unit of the present invention controls the modulation rather than hardware as in prior devices.

BRIEF DESCRIPTION OF THE DRAWINGS

FIGS. 5A and 5B are electrical schematic views of the circuitry of the present invention.

DESCRIPTION OF THE PREFERRED EMBODIMENT

Figure 1:
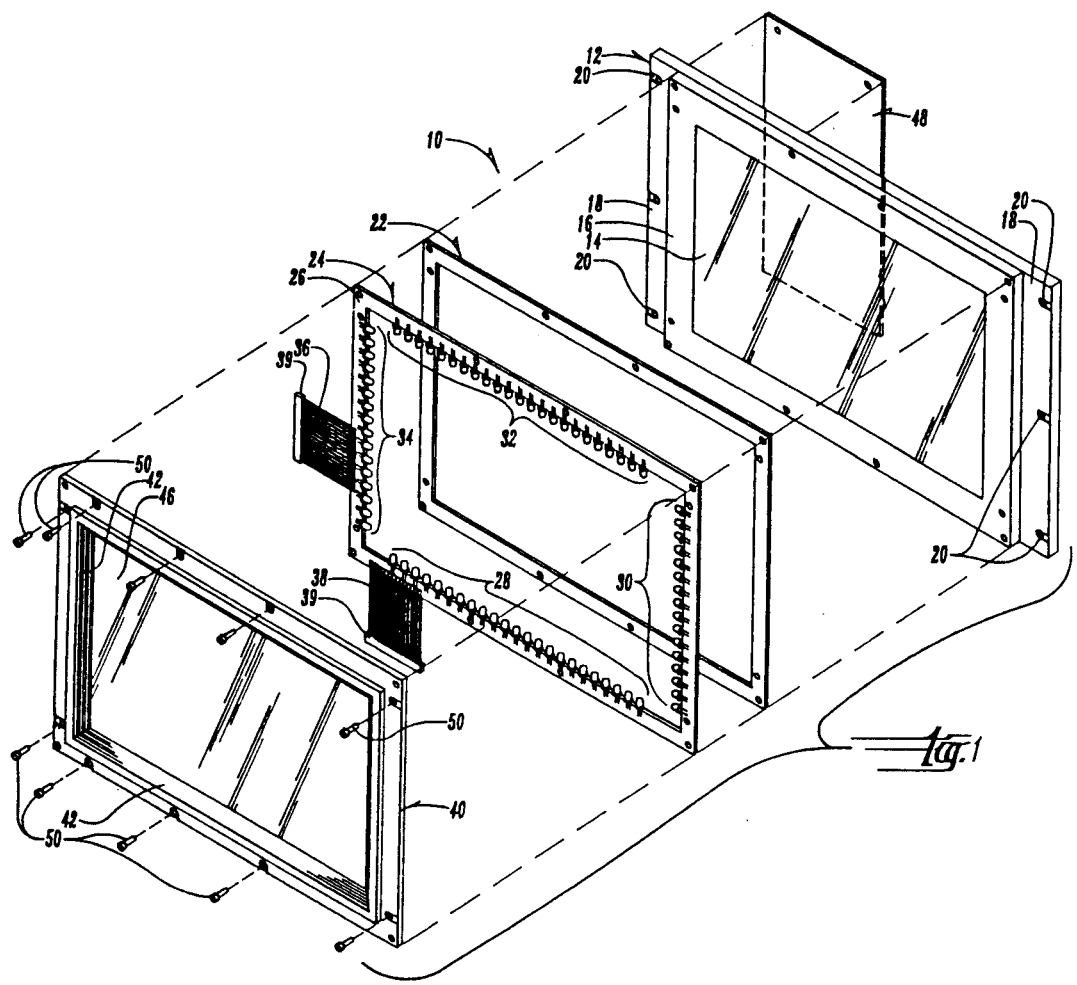
FIG. 1 is an exploded perspective view of the touch panel of the present invention.

Referring to the drawings, the numeral 10 generally designates the touch panel assembly of the present invention. Assembly 10 includes a panel display 12 having a display surface 14, a display frame 16, and a pair of side mounting flanges 18. Mounting holes 20 extend through the mounting flanges and permit mounting of the display to a housing or other device to which it is desired to attach the touch panel.

Secured over the frame 16 is an electrically insulative gasket 22, and in facing engagement with gasket 22 is the touch frame 24. Touch frame 24 includes a rectangular PC board frame 26 having a plurality of bottom LEDs 28 along one side thereof, and a plurality of right-hand LEDs 30 located on the right-hand side thereof. The LEDs are directed inwardly so that when they are energized they will project infrared beams across the interior space within frame 24. A plurality of top photo-transducers 32 and left-hand photo-transducers 34 are mounted on the top and left-hand side of the frame for receiving the beams from LEDs 28, 30 respectively. Attached to the left-hand side of the device is a detector cable 36 which is connected to each of the photo-transducers 32, 34. An LED cable 38 is connected to the bottom of the frame and includes cables leading to each of the LEDs 28, 30.

Figure 2:
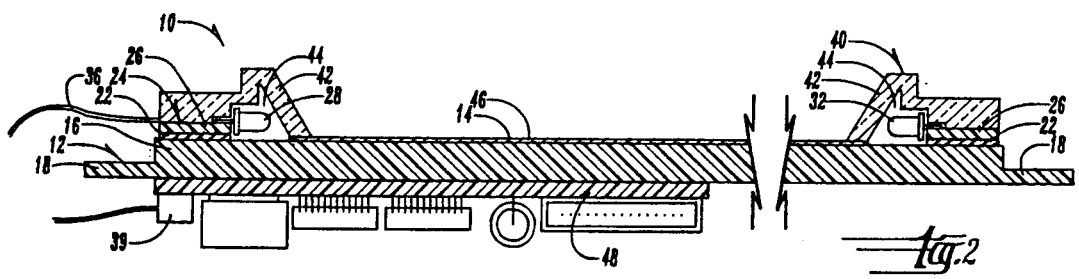
FIG. 2 is a sectional view of the touch panel assembled to a panel display.

Superimposed over the touch frame 24 is a bezel frame 40 having four inwardly canted or beveled lenses 42 behind which are provided elongated element channels 44. The element channels 44 receive the LEDs 28, 30 and the photo-transducers 32, 34 as indicated in FIG. 2. Thus, the light emanating from the LEDs 28, 30 extends through the lenses 42 and across the screen. A filter plate 46 is superimposed over the display surface 14 of display panel 12.

Mounted to the back surface of display panel 12 is a controller board 48 which includes a plurality of electrical components thereon to be described hereafter. The various components are secured together by means of screws 50 which extend through registered holes in the bezel 40, the touch frame 24, the gasket 22, the display panel 12, and the controller board 48. Detector cable 36 and LED cable 38 each include a connector 39 which is adapted to plug into controller board 48 as illustrated in FIG. 2.

Figure 3:
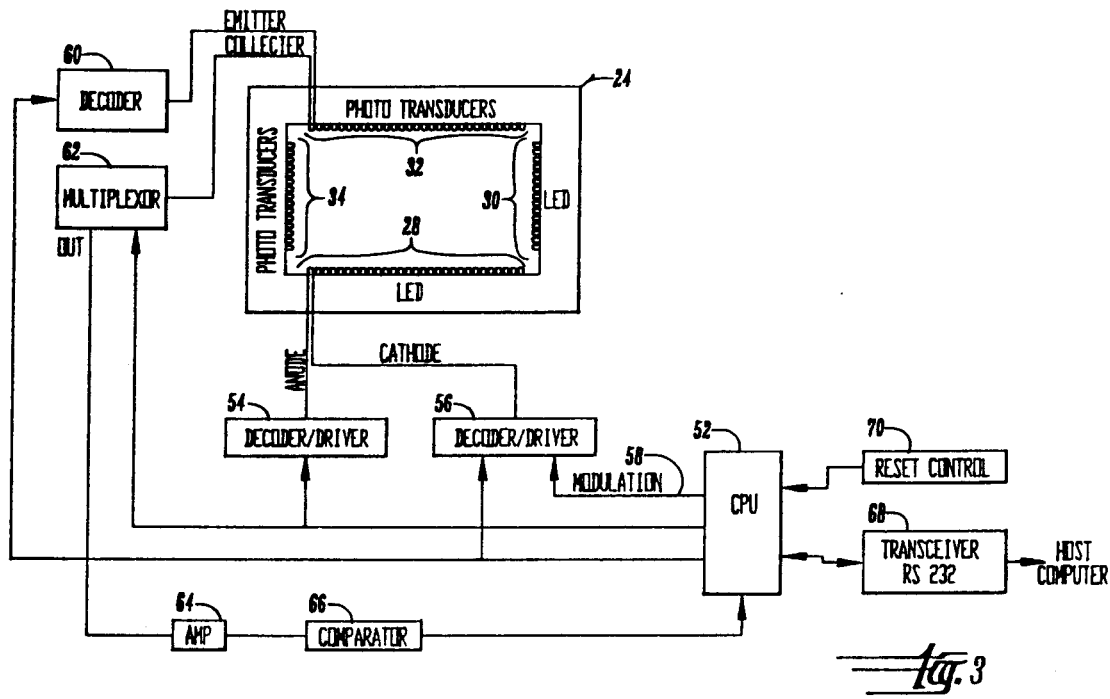
FIG. 3 is a block diagram of the touch panel of the present invention.

FIG. 3 illustrates a block diagram showing the various components on the controller board 48. These components include a central processing chip 52. The preferred model for Chip 52 is manufactured by Motorola under the model number MC68701S. An LED anode driver 54, and an LED cathode driver 56 are connected to the LEDs 28, 30 for driving them. The central processing unit is connected to the cathode driver 56 by a modulation line 58 which modulates the actuation of the LEDs 28, 30 as will be described hereinafter. Also contained on the board are a detector decoder 60 and a detector multiplexor 62, each of which is connected to each of the photo-transducers 32, 34. An amplifier 64 is connected to the multiplexor 62 and is also connected to a comparator 66 which in turn is connected to the central processing unit 52. A transceiver 68 is connected to the central processing unit and leads to a host computer. The transceiver permits the host computer either to receive signals from the central processing unit or to direct signals to the central processing unit. A reset control 70 is also connected to the central processing unit for placing the unit in condition to begin operating. An oscillator or clock circuit 80 is connected to the central processor 52 in conventional fashion.

Referring to FIG. 4, a series of special low value resistors 82 are included in the circuitry between multiplexor 62 and connector 39. Prior devices have used high value resistors having values as high as 1500 ohms for the purpose. However, it has been found that a superior definition is obtained on the screen if resistors 82 have a much lower value such as 200 ohms.

The central processing unit 52 is programmed with a program similar to the program which is contained within the appendix. The program provides several functions. One of the functions is to control the scanning of the anodes and the cathodes so they are enabled one at a time in a sequential fashion. The program stored within the central processing unit 52 also includes a modulation function which causes modulation of the light signals generated by each of the LEDs 28, 30 as they are actuated.

Figure 6:
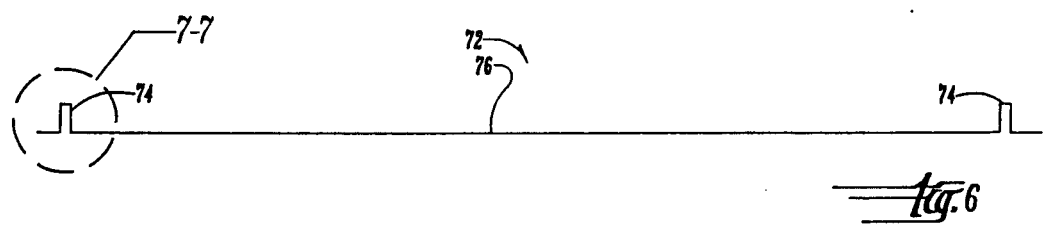
FIG. 6 shows the wave form generated by the program within the central processing unit.
Figure 7:
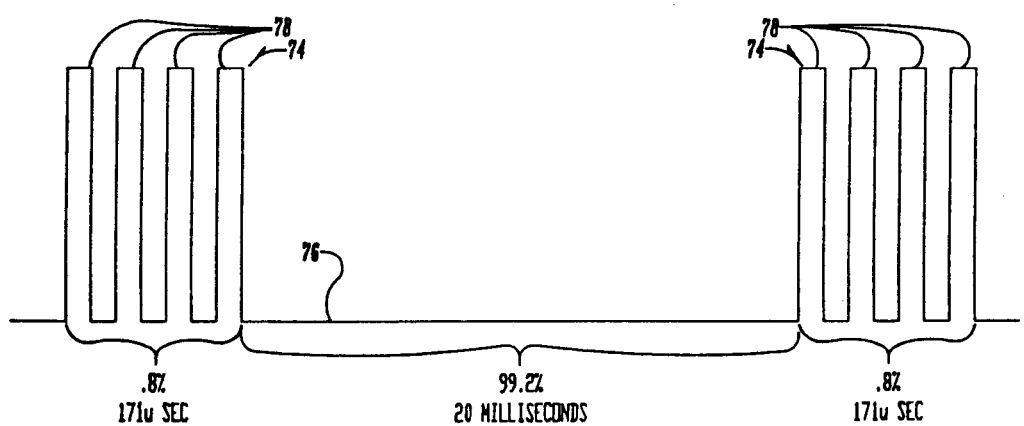
FIG. 7 is an enlarged view taken along line 7—7 of FIG. 6.

FIGS. 6 and 7 illustrate the signal which is generated by the program within central processing unit 52. The light signal is designated by the numeral 72, and includes an actuated portion 74 and a deactuated portion 76. As can be seen in FIG. 7, the actuated portion of signal 72 is modulated into a plurality of square waves 78 which are intermittently turned to an on and an off condition. The frequency at which this actuated portion is modulated may vary substantially without detracting from the invention, but the preferred range of modulation is between 60 and 90 kilohertz. The modulated portion of the circuit comprises approximately 0.8 percent of the entire cycle of the signal 72, with the remaining portion of the cycle comprising 99.2 percent of the period of the cycle. During the deactuated portion 76 of the signal, the other LEDs 28, 30 are being actuated one at a time.

The program within the central processing unit 52 also includes a portion which is capable of receiving signals from the comparators 66, analyzing those signals, and sending an output signal through the transceiver 68 to the host computer.

In operation, the central processing unit 52 causes the LED anode driver, 54 and the LED cathode driver 56 to actuate the various LEDs 28, 30 in a sequential fashion. The program within the central processing unit sends a digital modulation signal through modulation line 58 so as to modulate the LEDs by turning the cathodes of the LEDs on and off intermittently, thereby creating the activated modulated portion 74 of the signal 72, for each LED.

Simultaneously, the computer enables the photo-transducers 32, 34 in sequential fashion so that one transducer 32, 34 is actuated simultaneously with a corresponding LED 28, 30. The light signals detected by the photo-transducers 32, 34 are converted to electrical signals which are transmitted to the multiplexor 62 and from the multiplexor 62 to the amplifier 64 and the comparator 66. The comparator compares the signal received from the photo-transducers to a predetermined signal characteristic to determine whether or not the signal represents a blockage of the light beam across the panel 14 of the video display. If a blockage occurs, the comparator detects such signal from the characteristic of the signal sent to it from amplifier 64. The comparator then sends a blockage signal to the central processing unit 52. This blockage signal tells the central processing unit 52 that a blockage has occurred. The program within the central processing unit 52 then calculates the location of the blockage by analyzing the location of the blocked intersecting light beams which are emanated from LEDs 28, 30. The central processing unit then sends an output signal to the host computer.

By modulating the light output of the LEDs, it is possible to create a signal which is easily discriminated from and distinguished from the signals created by ambient light. Ambient light will be detected by the phototransducers, but the frequency of the modulated portion of the light signal is easily distinguished by the comparator 66, thereby minimizing any errors caused by ambient light.

The advantage of modulating the light signal with the central processing unit is that a separate component for creating a modulated signal is not required in the circuit. Furthermore, the specific timing of the light signal can be more easily controlled by the digital modulating signal generated by the central processing unit, and the modulation of the signal can be easily changed by reprogramming the central processing unit. The signal sent to the decoder drivers is a digital signal rather than an analog signal as is the case with hardware driven signals. This permits greater precision, and permits the amplification of the modulated signal by the amplifier 64 so as to give a good ratio of the modulated signal to outside noise created by ambient light. Consequently, very good discrimination can be achieved. Thus, it can be seen that the device accomplishes at least all of its stated objectives.

We claim:

1. A touch panel adapted to be connected to a host computer comprising:

a display area having a defined perimeter;

a plurality of beam emitter-detector pairs disposed around at least a portion of said perimeter of said display area; said emitter-detector pairs each comprising an emitter adapted to be actuated to direct an energy beam, and a detector positioned across said display area opposite from said emitter for receiving said energy beam in response thereto;

central processor means separate from said host computer connected to said emitter-detector pairs;

computer program means within said central processor means for causing said central processor means to control the actuation and deactuation of said emitter-detector pairs one at a time sequentially to create a plurality of energy signals each of which comprises an actuated portion and a deactuated portion;

said computer program means being adapted to cause said central processor means to create a modulation signal for causing said actuated portions of said energy signals to be modulated at a predetermined frequency, whereby said emitters will emit a modulated energy beam during the time that they receive said modulation signal;

said detectors each being adapted to sense said modulated energy beam and create a first electrical beam signal whenever said modulated beam passes unobstructed from each of said emitters to each of said detectors, said detectors each creating a second electrical beam signal different from said first beam signal whenever there is an obstruction of said modulated beam between said emitter and said detector during said predetermined period of time;

blockage detection means connected to said detectors, and said central processor means for sending a blockage signal to said central processor means in response to said blockage detection means sensing said second signal;

said computer program means causing said central processor means to generate an output signal indicative of the location of said obstruction on said display area in response to receiving said blockage signal from said blockage detector means.

2. A touch panel according to claim 1 wherein said predetermined frequency is between 10 kilohertz and 500 kilohertz.

3. A touch panel according to claim 1 wherein said predetermined frequency is between 60 and 90 kilohertz.

4. A touch panel according to claim 1 wherein said blockage detection means comprises a comparator means for determining whether or not said first electrical beam signal or said second electrical beam signal is present at any given moment of time.

5. A method for controlling a touch panel system adapted to be connected to a host computer and adapted to locate the position of an object adjacent to a display surface, said method comprising:

placing a plurality of beam emitter-detector pairs around at least a portion of said perimeter of said display area, said emitter-detector pairs each comprising an emitter adapted to be actuated to direct an energy beam and a detector positioned across said display area opposite from said emitter for receiving said energy beam;

connecting a microprocessor separate from said host computer to said emitter-detector pairs;

programming said microprocessor with a computer program capable of causing said microprocessor to scan said emitter-detector pairs and to send an energy signal to each of said emitters;

using said computer program to cause said microprocessor to modulate a portion of said energy signal at a predetermined frequency and to send said energy signal to said emitters one at a time for causing said emitters to direct a modulated energy beam having said predetermined frequency toward said detectors;

using said detectors to create a first detector signal in response to receiving said modulated energy beam and a second detector signal whenever said object blocks said modulated energy beam;

using a blockage sensing means connected to said detectors for sending a blockage signal to said microprocessor in response to receiving said second detector signal;

using said computer program to analyze said blockage signal to cause said microprocessor to generate an output signal indicative of the location of said object in said display area in response to receiving said blockage signal form said blockage detector means.

* * * * *